United States Patent
Heinzmann et al.

(10) Patent No.: US 7,539,689 B2
(45) Date of Patent: May 26, 2009

(54) BUNDLING DATABASE

(75) Inventors: Andreas C. Heinzmann, Weinheim (DE); Michael Hladik, Walldorf (DE); Stefan M. Linkersdoerfer, Wiesloch (DE); Stefan Schonger, Wiesloch (DE)

(73) Assignee: SAP AG, Walldorf (DE)

( * ) Notice: Subject to any disclaimer, the term of this patent is extended or adjusted under 35 U.S.C. 154(b) by 306 days.

(21) Appl. No.: 11/314,549

(22) Filed: Dec. 19, 2005

(65) Prior Publication Data

US 2007/0142925 A1   Jun. 21, 2007

(51) Int. Cl.
*G06F 17/00* (2006.01)
(52) U.S. Cl. .............................. 707/100; 707/2; 707/10; 707/102; 707/104.1
(58) Field of Classification Search ...................... 707/3, 707/101, 104.1, 201
See application file for complete search history.

(56) References Cited

U.S. PATENT DOCUMENTS

| | | | | |
|---|---|---|---|---|
| 5,960,194 | A  * | 9/1999 | Choy et al. | 707/102 |
| 6,964,055 | B2 * | 11/2005 | Hanses et al. | 707/101 |
| 2003/0158842 | A1 | 8/2003 | Levy et al. | |
| 2004/0153451 | A1 * | 8/2004 | Phillips et al. | 707/8 |
| 2005/0004996 | A1 | 1/2005 | Nagai et al. | |
| 2005/0165802 | A1 * | 7/2005 | Sethi et al. | 707/100 |
| 2005/0166187 | A1 | 7/2005 | Das et al. | |
| 2006/0167825 | A1 * | 7/2006 | Sayal | 706/45 |

OTHER PUBLICATIONS

XP002285342, "Multi-Capacity Bin Packing Algorithms with Applications to Job Scheduling under Multiple Constraints"; William Leinberger et al.; Department of Computer Science and Engineering, University of Minnesota (leinberg, karypis, kumar)@ cs.umn.edu; TR 99024: Draft May 27, 1999; pp. 1-23.

* cited by examiner

*Primary Examiner*—Charles Rones
*Assistant Examiner*—Rezwanul Mahmood
(74) *Attorney, Agent, or Firm*—Kenyon & Kenyon LLP

(57) ABSTRACT

A method and system for bundling objects containing related data. Objects that are related to each other are bundled together to avoid synchronization problems. The bundling process is performed in parallel, as are operations, such as calculations, performed on the objects.

44 Claims, 16 Drawing Sheets

US 7,539,689 B2

BUNDLING DATABASE

BACKGROUND INFORMATION

Large databases are frequently used to store information of all types, such as financial, customer, inventory, etc. However, databases are becoming more complex due to, for example, increasing number of users, fields in the tables, and relations between various tables and their items. Access to the tables is also limited by various factors, such as disk speed and synchronization of calls to a database table. The increasing size of the tables and the relations in the corresponding data only decreases the speed and accessibility of information from a database table. Computer programs, such as financial or banking programs, frequently must access databases with millions of processes and objects. If objects are processed linearly, the time taken to complete any given task would increase (at least) proportionally to the number of objects needed to be processed. This is unacceptable with the growing complexity of processes and calls to the database. However, processing objects in parallel to access a database also presents a synchronization problem. Two objects may have a relation between each other (e.g., in an example banking context, a loan and its collateral) and have to be processed together (e.g. to calculate the credit risk for the loan mitigated by its collateral). These relations can be arbitrarily complex, they are not restricted e.g. to trees with a clearly identified root. If two objects are processed in parallel at the same time this may lead to duplicate results. The synchronization needed to avoid the conflicts often leads to a decrease in performance that can at worst be slower than if the process was carried out sequentially. This synchronization is a particular problem if the parallel processes are running on different machines that do not have a fast communication path (such as a shared memory) but only a network connection. A method and system is needed to be able to process objects in parallel to decrease the time needed, while at the same time avoiding duplicate results. The efficiency gain using a separate bundling algorithm is especially significant if the second step ("calculation process") is very processing intensive.

DETAILED DESCRIPTION

To decrease the time needed to run multiple processes on a plurality of objects and to avoid synchronization problems, an embodiment of the present system bundles objects together so that all objects are related (according to given settings). The related objects in a bundle are processed together in one parallel process because all the objects are related in the sense of having dependencies between the data of the objects. These dependencies may be different for different application domains. However, other bundles, which contain objects unrelated to other bundles, can be processed in parallel. The parallel bundles will never overlap because objects in different bundles are unrelated to each other (i.e. in terms of data). For efficiency purposes, computations in the second process that may involve data in these bundles, e.g., a calculation, ("calculation processes") are also executed in parallel. The terms computation and calculation process are used interchangeably and they mean the use or manipulation of the data or the relations between the data that may be found in the objects. The advantage of the bundling process is that read and write access to the database is minimized while providing efficiency in the calculation process through parallel processing.

Figure 1A:
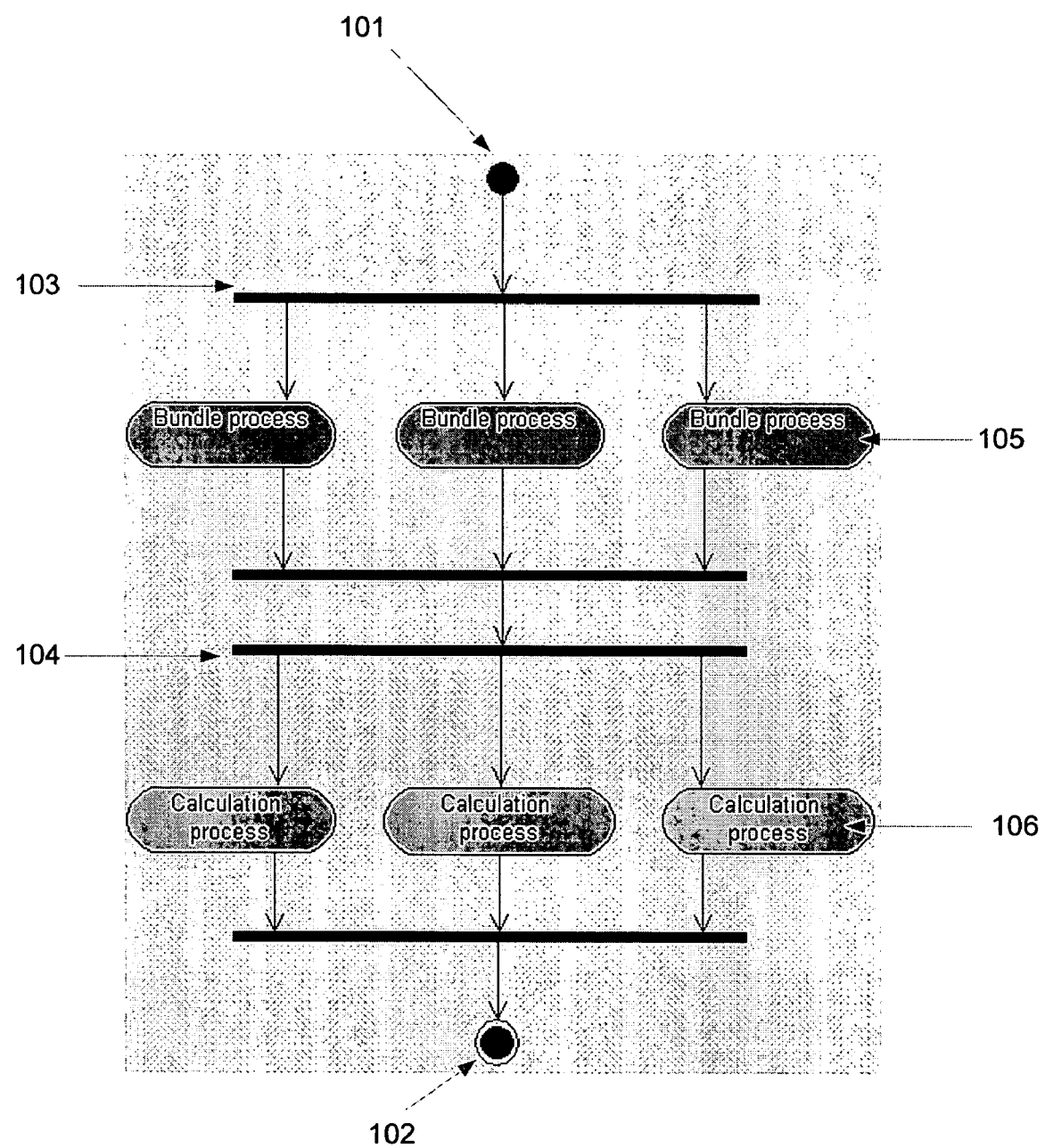
FIG. 1a depicts a broad overview of the two groups of parallel processes.

FIG. 1a provides this general overview of an embodiment of the present invention. At the start of the processing 101 there may be millions of objects that need to be manipulated and processed. The bundling process 103 (only three are shown as examples, but there could be n number of bundling processes) begins first by dividing the objects into different work packages. The bundle process 105, performed in parallel, takes the work packages and creates bundles. Unique bundles that are created are placed into a Bundle Data Base, which is a temporary holding database that stores these unique bundles. Each bundle process is performed in parallel, each processing several work packages. When the bundling process is complete, that is all the objects are placed in corresponding unique bundles, all of which contain related objects, the calculation processing 104 commences. Each bundle could be its own calculation process 106 (only three are shown as examples, but there could be n number of calculation processes), or alternatively, each calculation process 106 could process several bundles in one package. The calculation processes 106 are performed in parallel. When all processing is completed, the database can commit all changes and the program can indicate that processing is completed 102 and/or report errors.

Figure 1B:
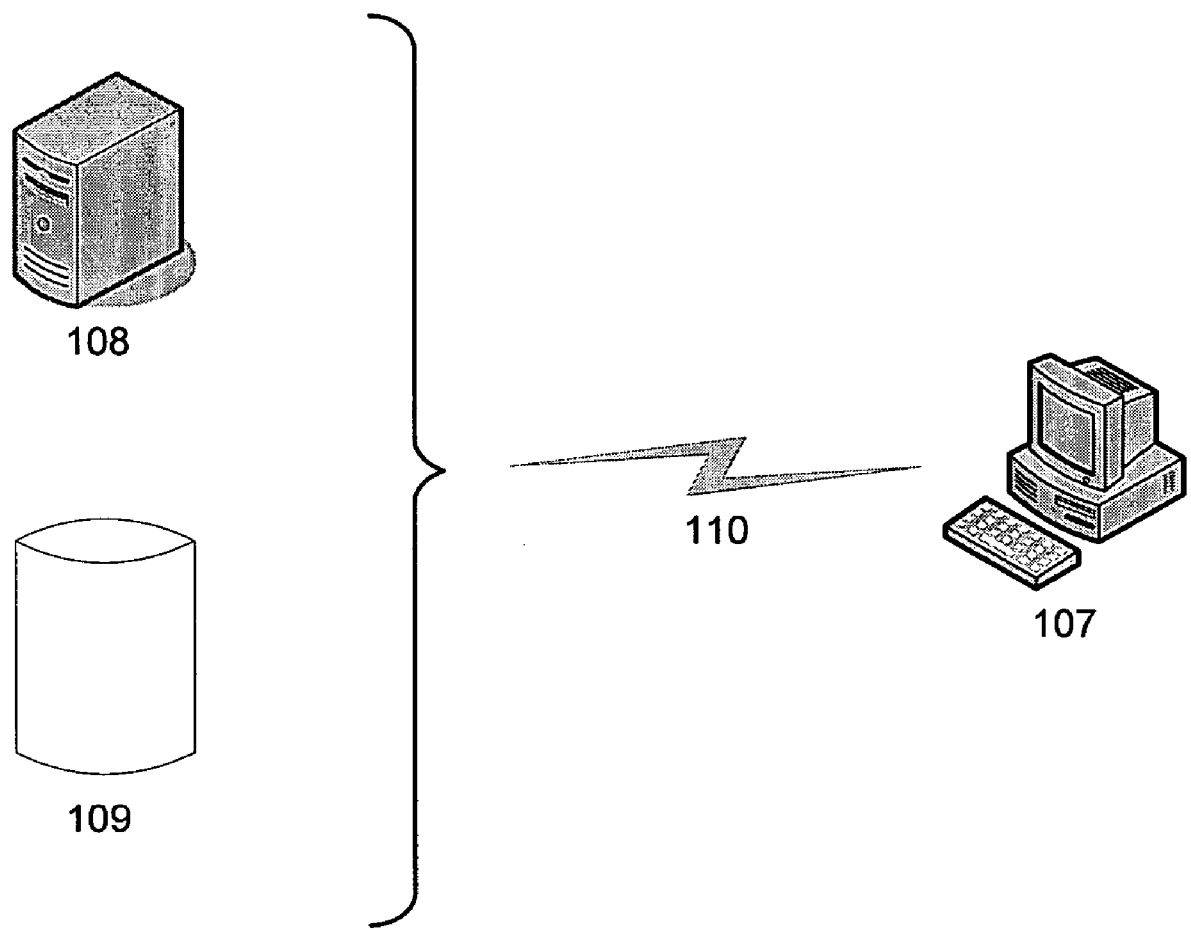
FIG. 1b depicts a system capable of performing the processes.

FIG. 1b depicts a system capable of performing the bundling and calculation processes. One or several computing devices 107 are connected through a communication medium to servers 108 or any device capable of database features 109 (only one of each is shown for exemplary purposes). Parallelization of processes includes the case where parallel processes are being executed on several machines in parallel (or on one machine having one or several processors). A computing device 107 is any device capable of calculation, such as a computer, handheld device, laptop, etc. The communication medium 110 could be a wireless signal, a wire, USB connection, etc. Databases are typically housed on servers 108 over a communication medium 110 such as a network. Databases can also be set up on many types of hardware systems 109 including the computing device 107 itself.

Figure 2:
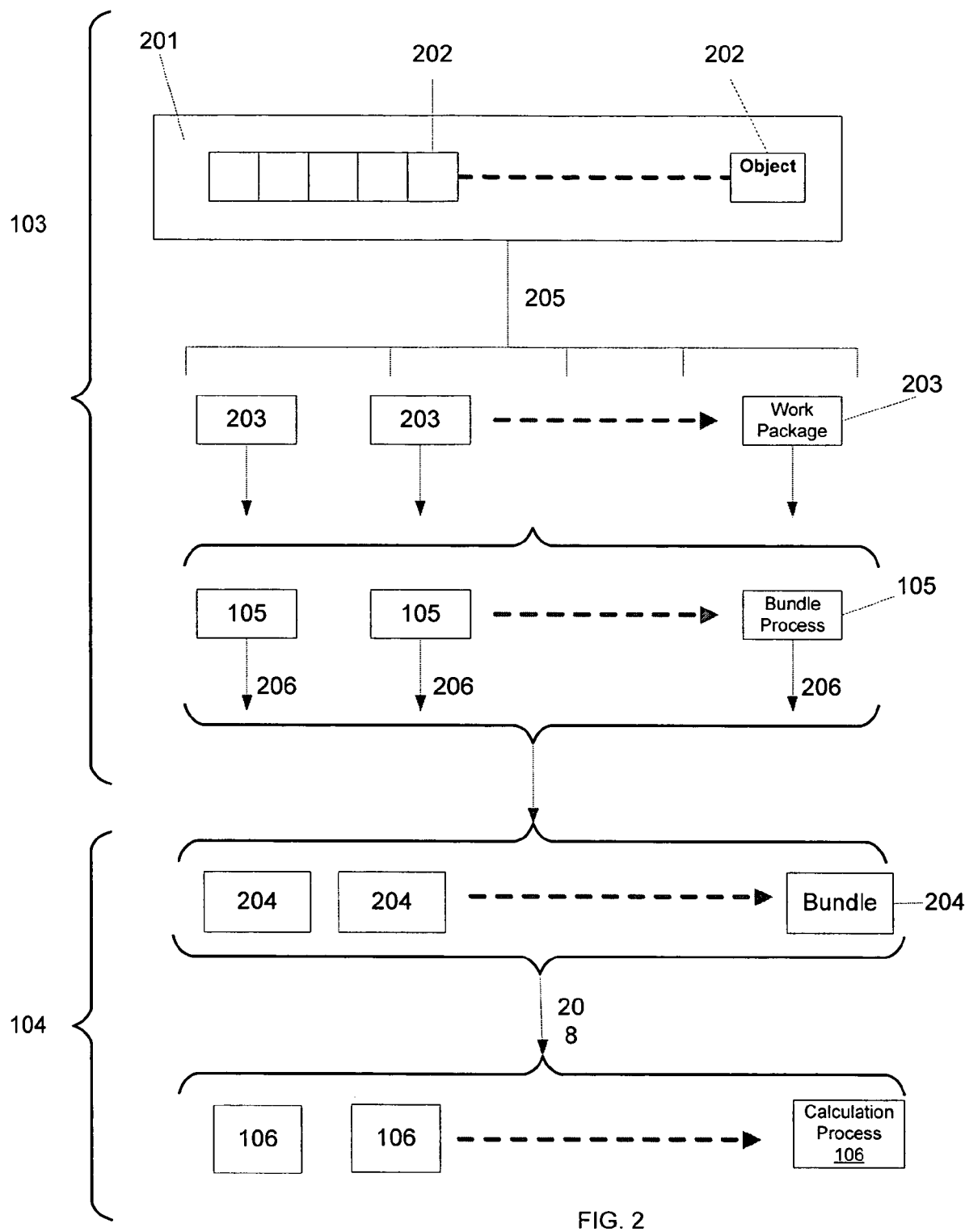
FIG. 2 depicts an object view of the two groups of processes.

FIG. 2 depicts an object view of the various processes. The overall bundling process 103 begins with a large array or group 201 of n number of objects 202. This group of objects is distributed 205 to various work packages 203. For efficiency purposes, the number of packages 203 should ideally be greater than the number of available parallel processes.

The distribution of objects 205 can be performed through various means. For example, objects 202 can be distributed randomly to the work packages 203. Alternatively, the distribution process 205 can iterate through the array of objects 201 and place each object 202 into a work package 203, repeat the process so that each package has a second object, a third, and so forth so that objects 202 are evenly distributed among the work packages 203. Thus, object n would be placed into package number (n mod x). Another possible efficient alternative would be to take a range of objects 202 and place the group into work packages 203. Thus, the first y objects would be placed into the first work package, the second y objects would be in the next work package, and so forth.

When the objects 202 are in the various work packages 203, the work packages are then distributed, much like the objects were, to various parallel bundling processes 105 which may reside on different machines. Again, the method of distribution of work packages can be one of many types. The work packages 203 are processed in parallel, each is placed in a queue within one of several parallel bundling processes 105. Within each bundling process 105 objects are placed 206 in bundles 204 created by the bundling process 105. The bundles 204 may be later synchronized with a Bundle Data Base at the end of the processing of the work package 203.

Each bundle 204 is unique and contains a unique identifier (UID). The bundle 204 is unique based on the objects that are contained and the links and related objects associated with that object. The objects are placed 206 in bundles 204 based on the UID and the relations between the data in the objects. A bundle process 105 accesses an initial object and then searches through the various links to determine related objects that could be affected by a manipulation of the data in the initial object. The search method to find all associated objects/links can be any number of search algorithms, such as a breadth-first search, depth-first search, iterative-deepening search, etc. When the associations of the bundle 204 are determined, a unique ID is determined, either from a hash function, or any other algorithm or function that can receive input and produce a unique ID that is stable, i.e. produces the same ID given the same bundle consisting of objects and relations. The input can be values taken from the relations of the object, or another possible alternative is to use variables associated with characteristics of the objects 202 or bundles 204. Each bundle 204 also contains the values of the relations and links between the various objects associated with the bundle 204. Each unique bundle 204 is placed into a Bundle Data Base so that each bundle in a database has a UID.

An advantage of the bundling database is that the elimination of duplicates may be achieved by deriving a UID of the bundle from its content. Most duplicates can be prevented by checking at the beginning of each package whether the objects in the package are contained in an already calculated bundle. This does not eliminate all duplicates but since the processing time of building a bundle once the data is read is significantly less than that of the communication done to access a Bundle Data Base some duplication is allowed in this step before saving the data in the Bundle Data Base. If this were not the case, then synchronization may occur while bundles are being created.

The bundling process 105 processes all objects in a work package, and when all relations and bundles have been determined, a synchronization step occurs to prevent duplicates in the bundling database. During the synchronization step, any bundles that already exist in the Bundle Data Base are not placed in the Bundle Data Base, but rather they are discarded. Since the creation of duplicates is extremely rare under normal circumstances, the discard step could be done on the database side. After all bundles have been created the calculation process 106 begins in parallel. The bundles 204 can be distributed, much like the objects and work packages, by various methods and placed into parallel calculation processes. Due to the UIDs of the bundles, all the calculations can be done without a worry of synchronization because all related objects (with related data) are processed together linearly in one parallel process.

Figure 3:
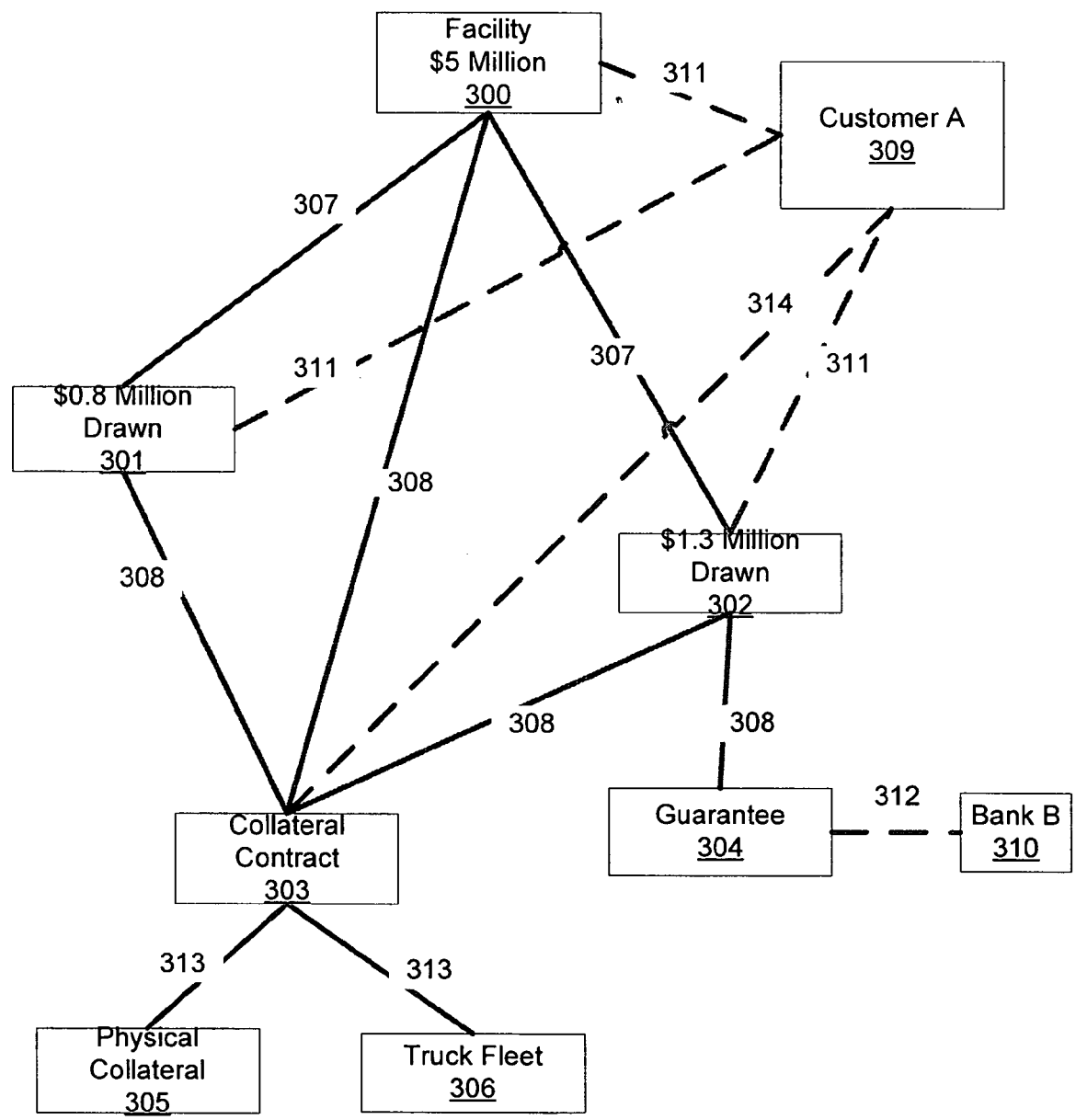
FIG. 3 illustrates an example of an advantage of a bundling database.

FIG. 3 illustrates an example of an advantage of a bundling database. The bundling database takes a first plurality of objects containing data that may depend on data in a second plurality of objects. The bundling database creates bundles of objects and thus processes them together as a group. For example, in a financial context, specifically in the business context of credit risk calculation for a bank, banks may calculate credit risk both to asses their internal risk (e.g., to adjust their risk premiums) and to comply with regulatory and disclosure requirements, for example in a Basel II framework. In this scenario, exposures (e.g., loans) and their respective collateral (e.g., guarantees or collateral contracts referring to assets such as houses (physical assets)) are calculated (i.e. in this example, used to mean actual mathematical calculations when done in the calculation processing step) together using additional data (not relevant for bundling) from other objects such as the business partner (which carries a rating indicating the risk of default). This list is not complete, e.g. for the trading book, there additionally are bundling-relevant netting agreements grouping several exposures that have to be calculated together.

For example, the data contained in FIG. 3 would represent relations and data that would be found in a single bundle. In FIG. 3, relations 308 represent where Customer A 309 has a loan with a Bank C (not shown). Relations 307 represent where Customer A 309 has facilities (e.g. a frame contract) with Bank C (not shown). Relation 313 is where Customer A's assets are provided as collateral to Bank C (not shown). There are other relations (dotted) that are not relevant for bundling in this context but could be in others: Relation 311 indicates that the facility was agreed upon with Bank C and a $0.8 million and $1.3 million loan are taken out by Customer A 309. Relation 312 indicates that guarantee 304 is provided by Bank B. Relation 314 indicates that a collateral contract 303 belongs to business partner Customer A 309. Bank C (not shown) may use these objects/contracts to calculate their credit risk is not shown in the picture. Bank B is (from Bank Cs perspective) just another business partner that provides collateral (in this case, a guarantee).

FIG. 3 illustrates the example where a Bank C (not shown) may have a facility 300 with a Customer A 309 over $5 million that Customer A 309 has secured to build new office buildings. Of these $5 million, $0.8 million are drawn 301 via one contract (to buy the property) and $1.3 million are taken out 302 via a second contract a bit later to build the first building. In order to get the facility over $5 million 300 from Bank C, Customer A 309 has provided collateral: a second property 305 as an asset to a collateral contract 303 as well as a part of the company's truck fleet 306 as assets to the same collateral contract 303. Unfortunately, Customer A's rating has since deteriorated, but Customer A 309 has managed to get Bank B 310 to provide a guarantee 304 over $0.3 million towards the second loan (only). From a credit risk perspective, all these objects (facility, loans, collateral contract, assets, guarantee) have to be processed together since some objects create risk (e.g., loans 301 and 302 drawn from facility 300) and some get risk transferred to (e.g., guarantee 304) and their relations/correlations have to be taken into account (e.g., a maturity mismatch between 300 and 303 resulting in less credit risk getting transferred). Data from other objects (e.g., business partner rating, market data) is also read but are not relevant for bundling for this concrete scenario (i.e., not all loans of a business partner have to be processed together).

In another business scenario, e.g. calculating the default probability of a business partner, other bundling criteria may be defined (e.g., all loans and guarantees of one particular business partner would form one bundle). In the example shown in FIG. 3, this would result in taking the dotted lines into account. Or, for internal purposes, a bank may select to take other correlations into account to calculate additional credit risk key figures. For example, in order to calculate country risk, relations from loans to collateral that cross certain country boundaries would have to be ignored. While the examples provided are in the field of business, embodiments of bundling databases may be applied to objects that contain relations between data in other fields as well.

Figure 4A:
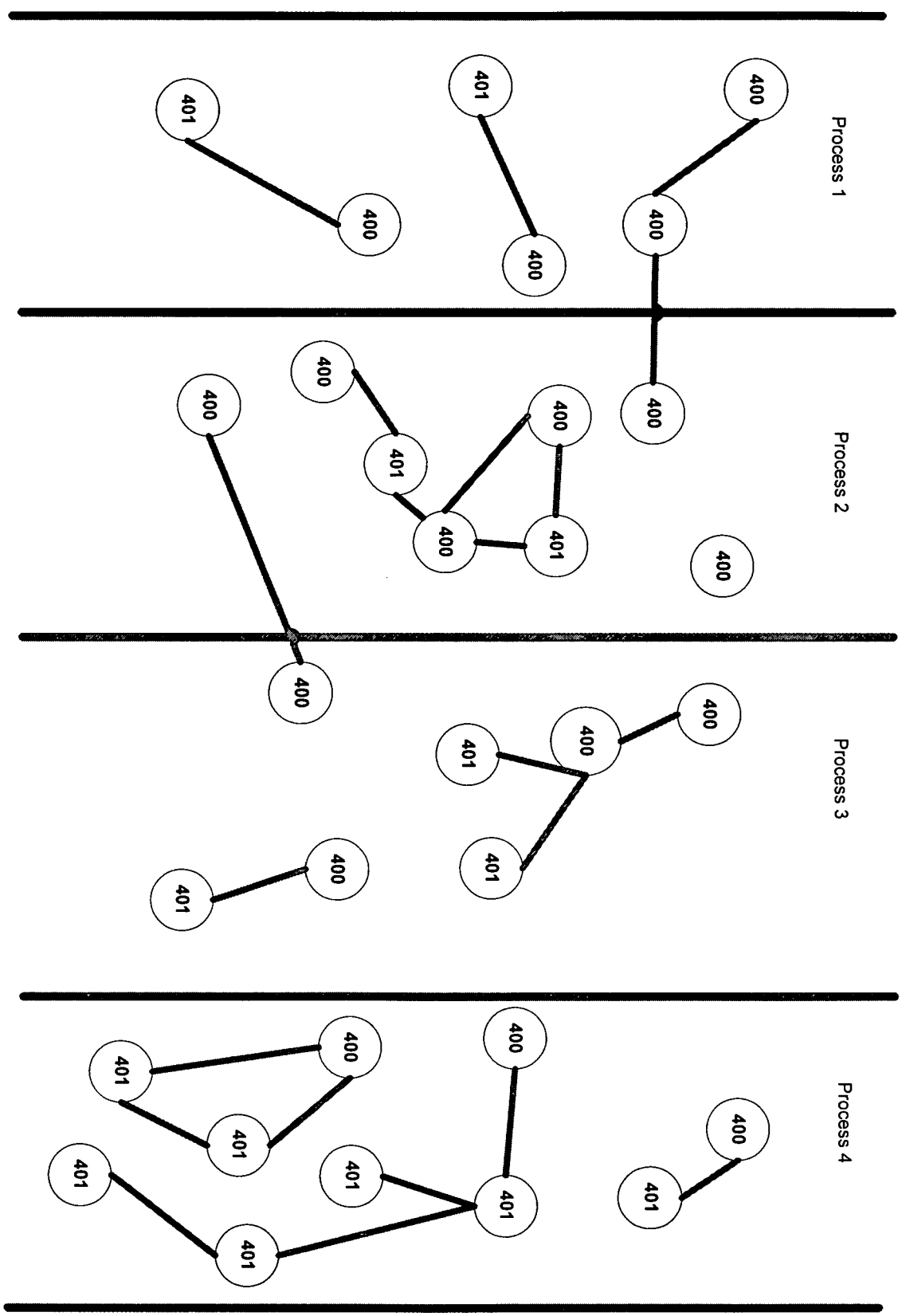
FIG. 4a to 4i illustrate an example bundling process starting from the middle of an already running process.

FIGS. 4a to 4i illustrate an example bundling process starting from the middle of an already running process (i.e. some work packages have already been processed). The figures show an example with four parallel bundling processes; however, it is possible in other embodiments to have significantly more than four parallel processes. These processes can be executed on one or several machines. FIG. 4a shows the set of business objects to be processed, where all nodes (used interchangeably with the word "object") of the number 400 are the initial selection, meaning that at the beginning of a process only the nodes labeled 400 are known by the work package. The known nodes are assigned to the processes but not yet processed. Nodes of number 401 are simply unknown nodes that will later be discovered by the iterative search for related nodes. Even though there are unknown nodes 401, they are easily discoverable because each node contains information regarding all related nodes. Thus, an advantage of the bundled database is that all the nodes are able to retrieve relations in both objects (i.e. all links from a node and all links to a node).

Figure 4B:
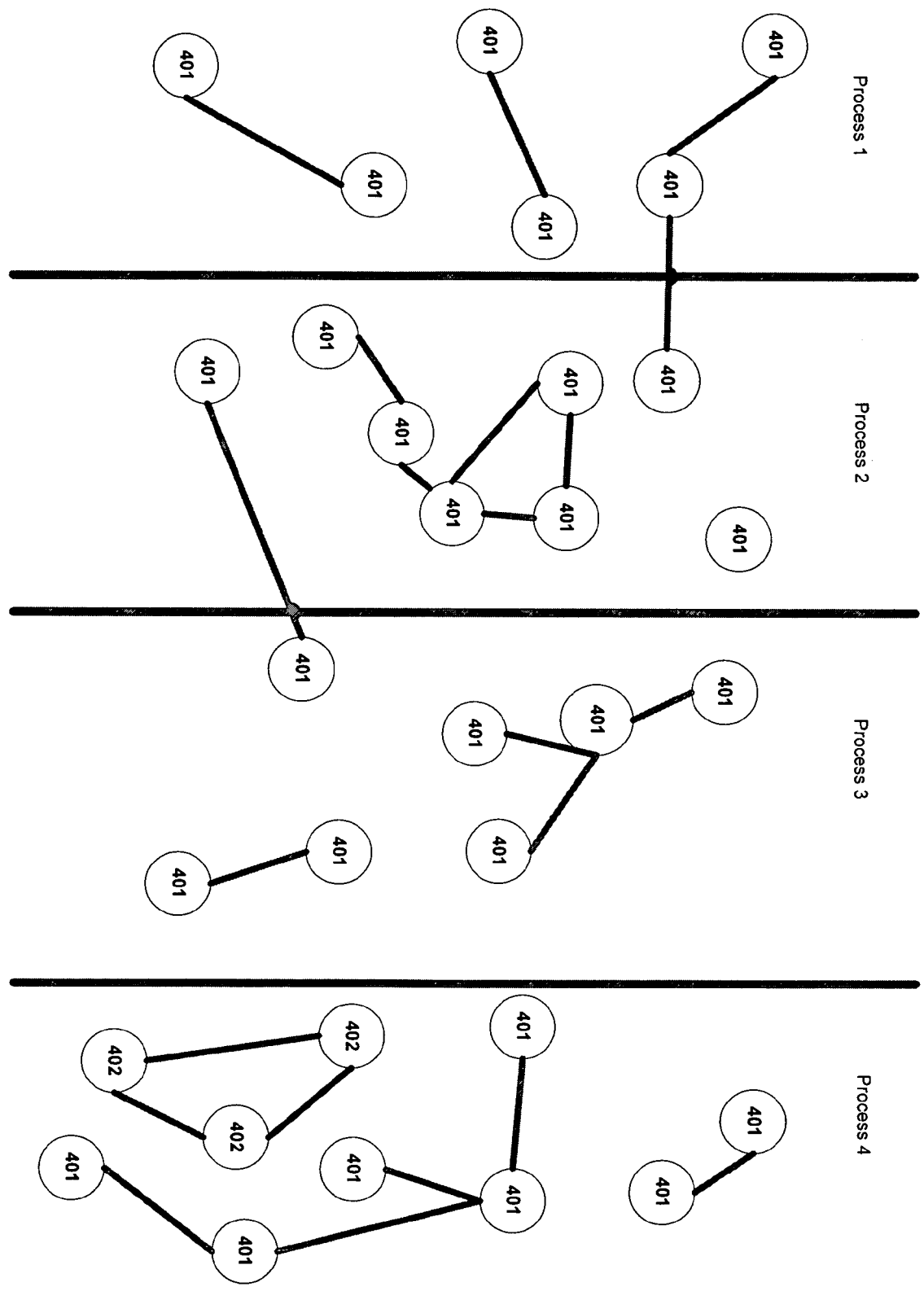

FIG. 4b illustrates an example where nodes of the number 402 are nodes that are identified as already having been processed in a previous work package and thus can be eliminated before the process, in this example Process 4, even starts. Synchronization of the bundles is done before and after each work package is processed.

Figure 4C:
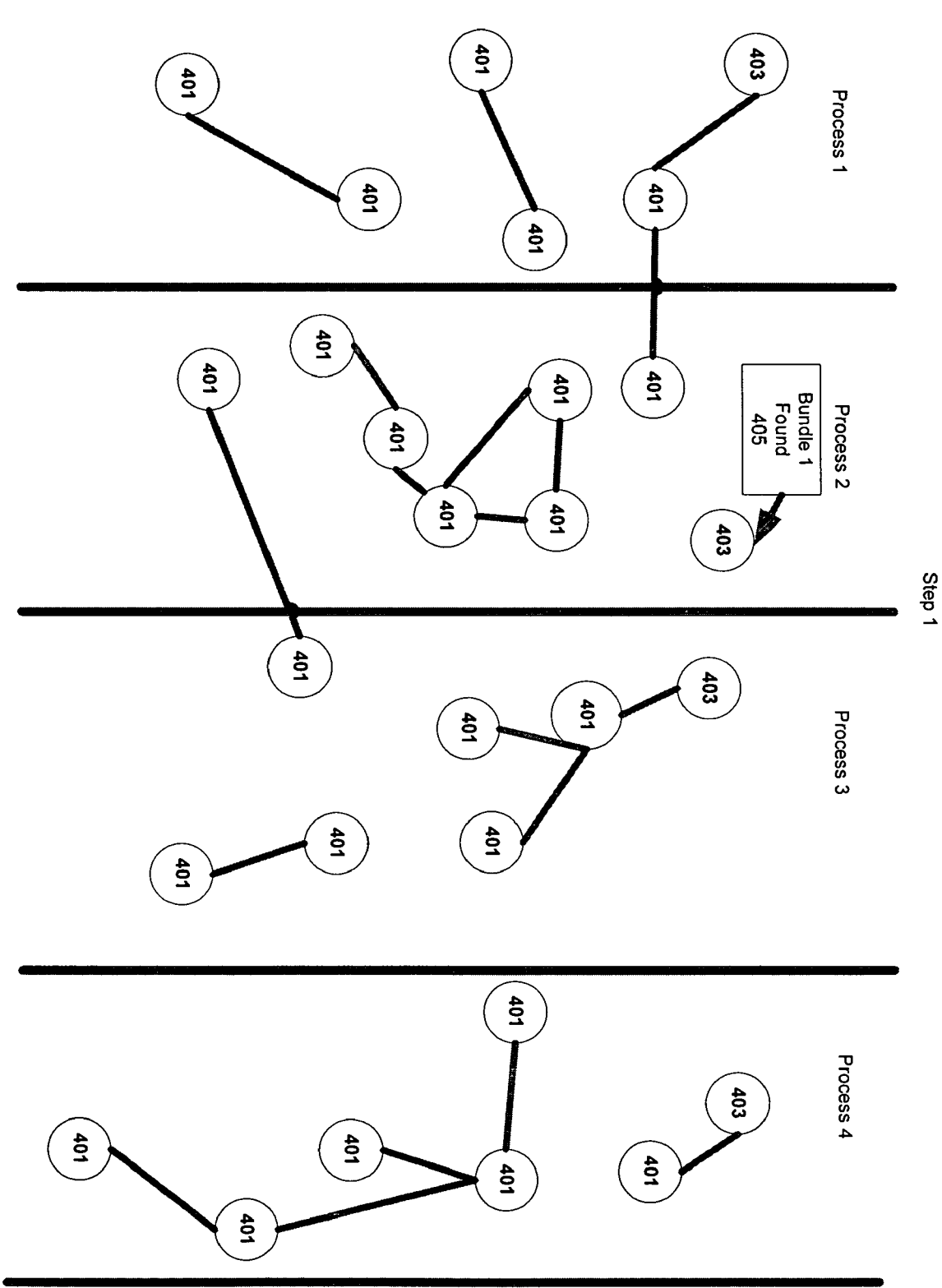

FIG. 4c illustrates an example first step of a bundling process. Nodes with the number 403 are nodes that are currently under investigation by each process. In the example, a first bundle is found 405 in Process 2 as it the node has no relations to any other node. Thus a first bundle is created, a UID assigned, and the node placed in the newly created bundle. The first bundle is then placed in the Bundle Data Base. As each new bundle is found and created it may be placed in the Bundle Data Base. In one example embodiment, it is possible that the calculation process would not wait until all bundling is completed. If the computations required are not processor intensive, the second bundling and calculation step may not be required. In this situation, the bundles may be processed for computations or any other operations as soon as they are created. Thus, it may be possible for the first bundle to be processed as soon as it is recognized as being a complete bundle (i.e. not having any other relations to be checked).

Figure 4D:
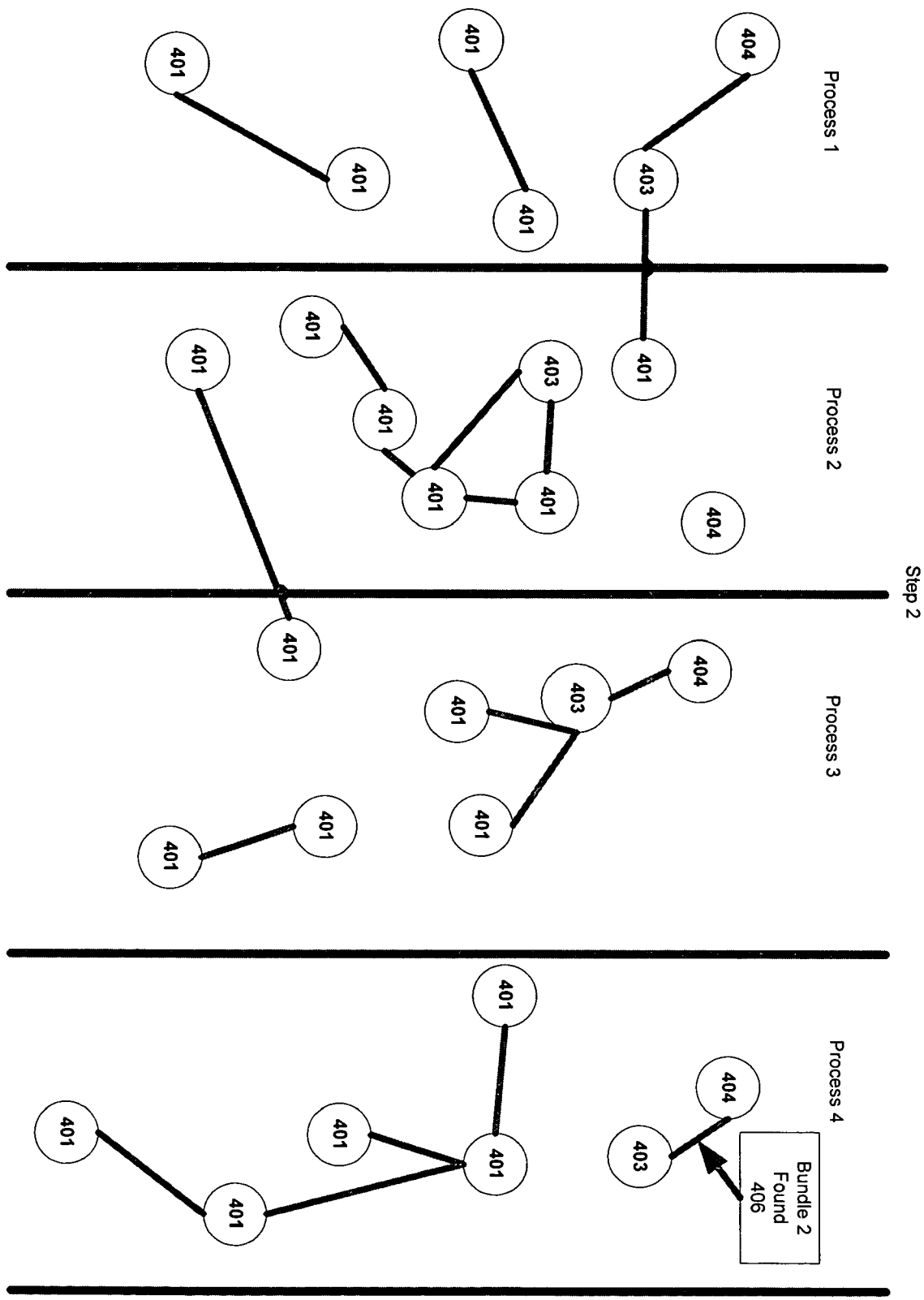

FIG. 4d illustrates an example second step of a bundling process. The node 404 represents nodes that have already been investigated. In the figure, all the nodes that had been 403 in the previous step are currently 404 nodes, and a related node is a 403 node, as the related nodes are currently under investigation. In Process 4 a second bundle is found 406 as all the links that exist between the nodes are found.

Figure 4E:
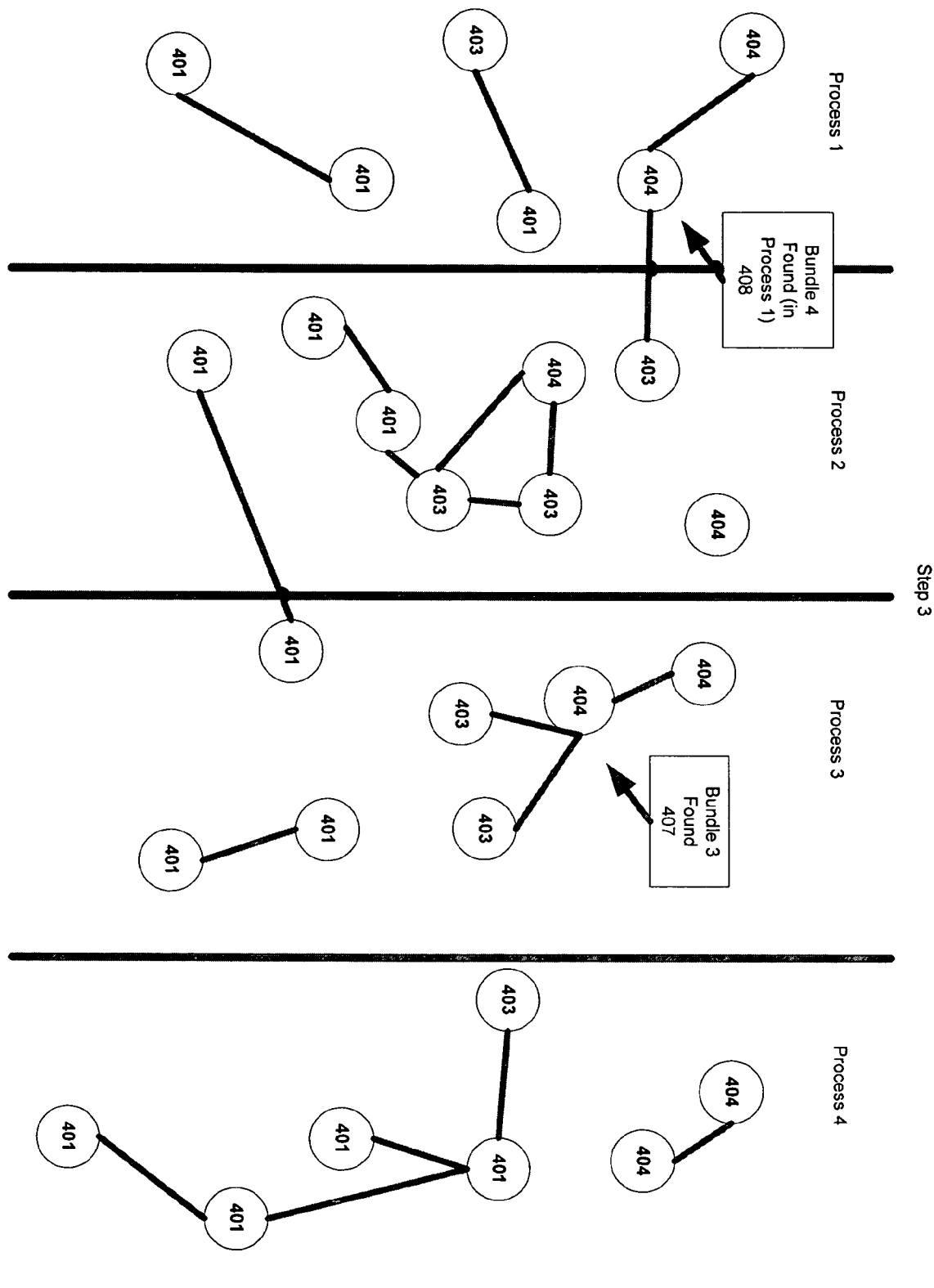

FIG. 4e illustrates an example third step of a bundling process. Once again, all nodes numbered 404 represent nodes that have already been investigated. Nodes that are numbered 403 are nodes that are currently investigated. A third bundle is found 407 in Process 3 and a fourth, bundle is found 408 by Process 1. Process 2 may investigate the nodes that are in Process 1 and create its own bundle; however, the placement of the newly created bundles placed in the Bundle Data Base depends on which work package finishes first. If Process 1 completes its work package first and places the bundle into the Bundle Data Base, when Process 2 completes its work package and discovers that it has a redundant bundle, it will discard the bundle it created. On the other hand, if Process 2 completes its work package before Process 1, the newly created bundle of Process 2 will be placed in the Bundle Data Base. Then, when Process 1 completes its work package it will discard the redundant bundle that it created. This is true if nodes were also to span across more than one other process. Whichever process finishes first will place its newly created bundle into the Bundle Data Base, and other process that finish later will discard their redundant bundles.

Figure 4F:
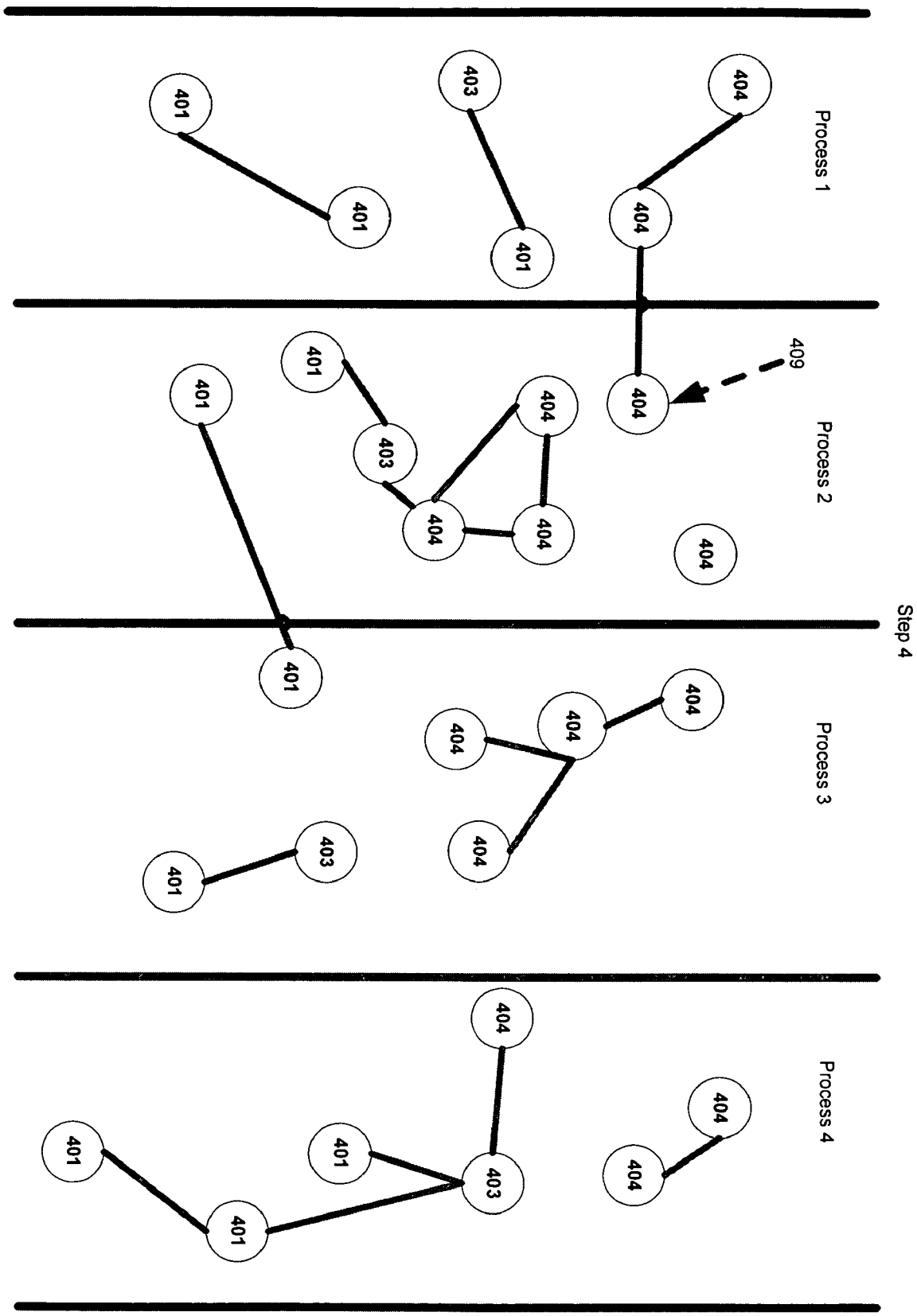

FIG. 4f illustrates an example fourth step of a bundling process. The arrow in 409 indicates that it is possible that in one example embodiment of the bundling database that multiple processes are finding the same bundle. This only happens if the two processes run concurrently, not when the first process has already written the package containing the bundle to the bundle data base. In the case of FIG. 4f (step 409) case, the duplicate bundles are eliminated at the end of the package in the synchronization step. Another example of this occurs in FIG. 4i.

Figure 4G:
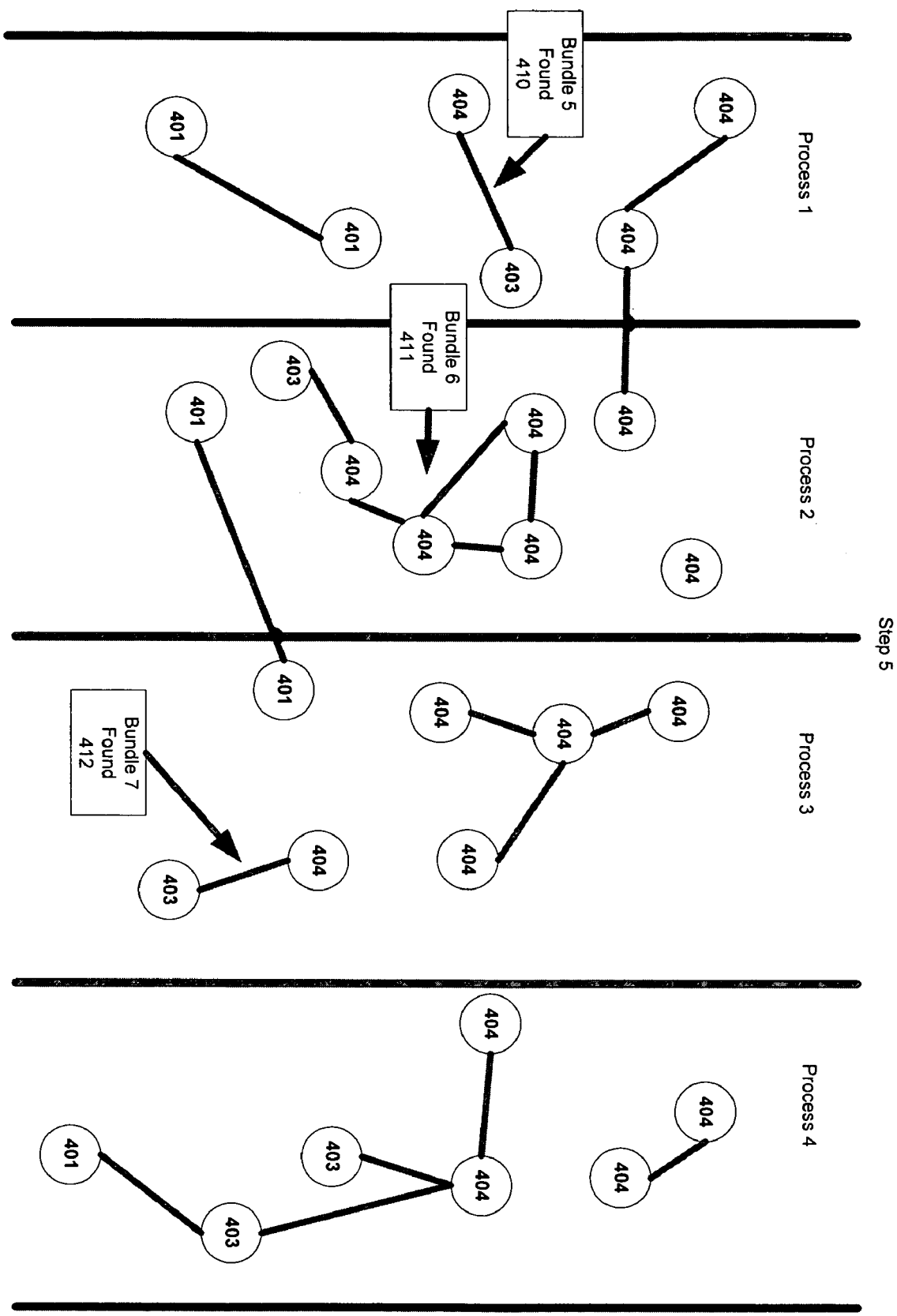

FIG. 4g illustrates an example fifth step of a bundling process. A fifth bundle is found 410 in Process 1, a sixth bundle is found 411 in Process 2, and a seventh bundle is found 412 in Process 3.

Figure 4H:
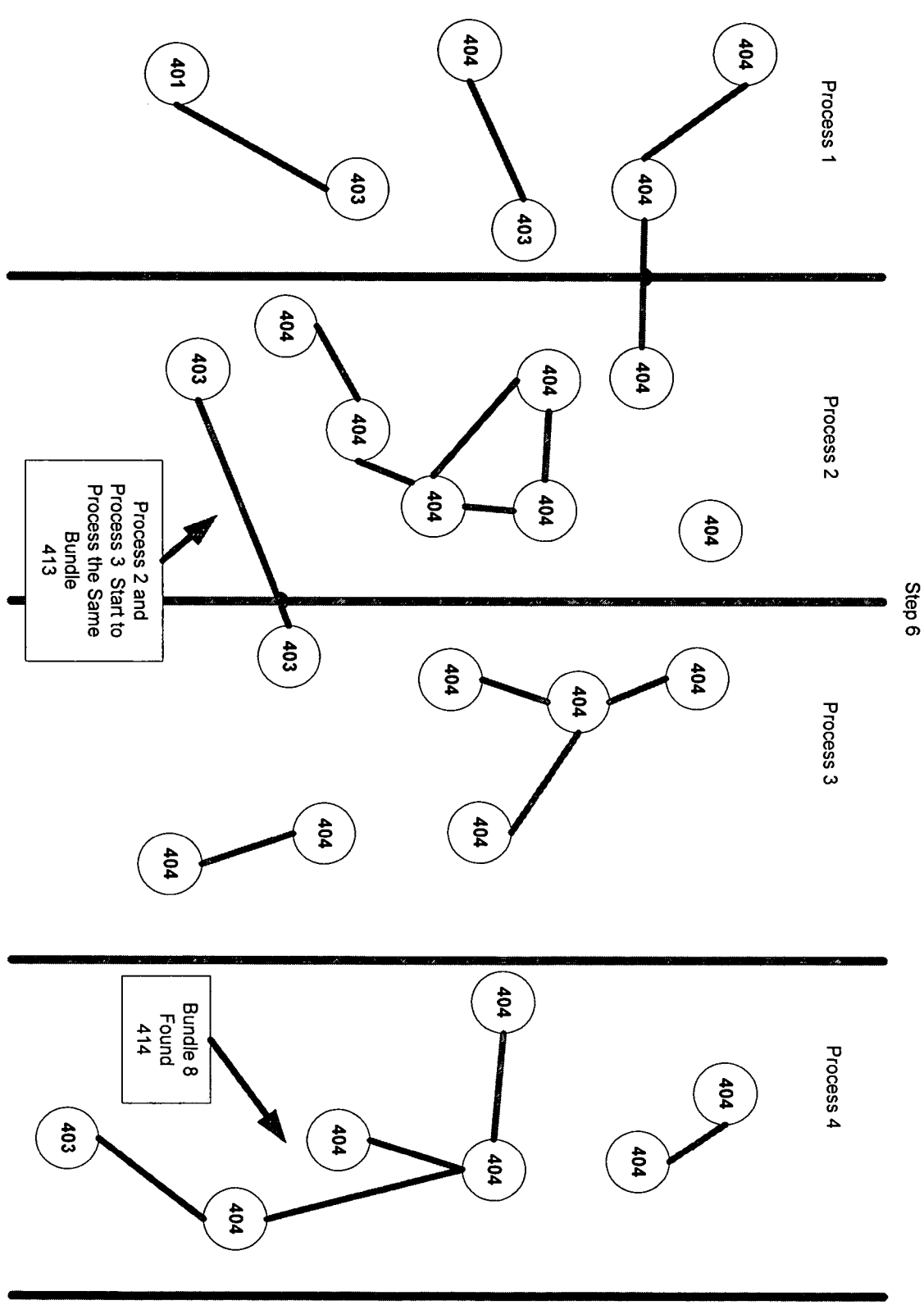

FIG. 4h illustrates an example sixth step of a bundling process. In this step, both Process 2 and Process 3 start to process the same bundle 413 starting at the same time. In addition, an eighth bundle is found 414 in Process 4.

Figure 4I:
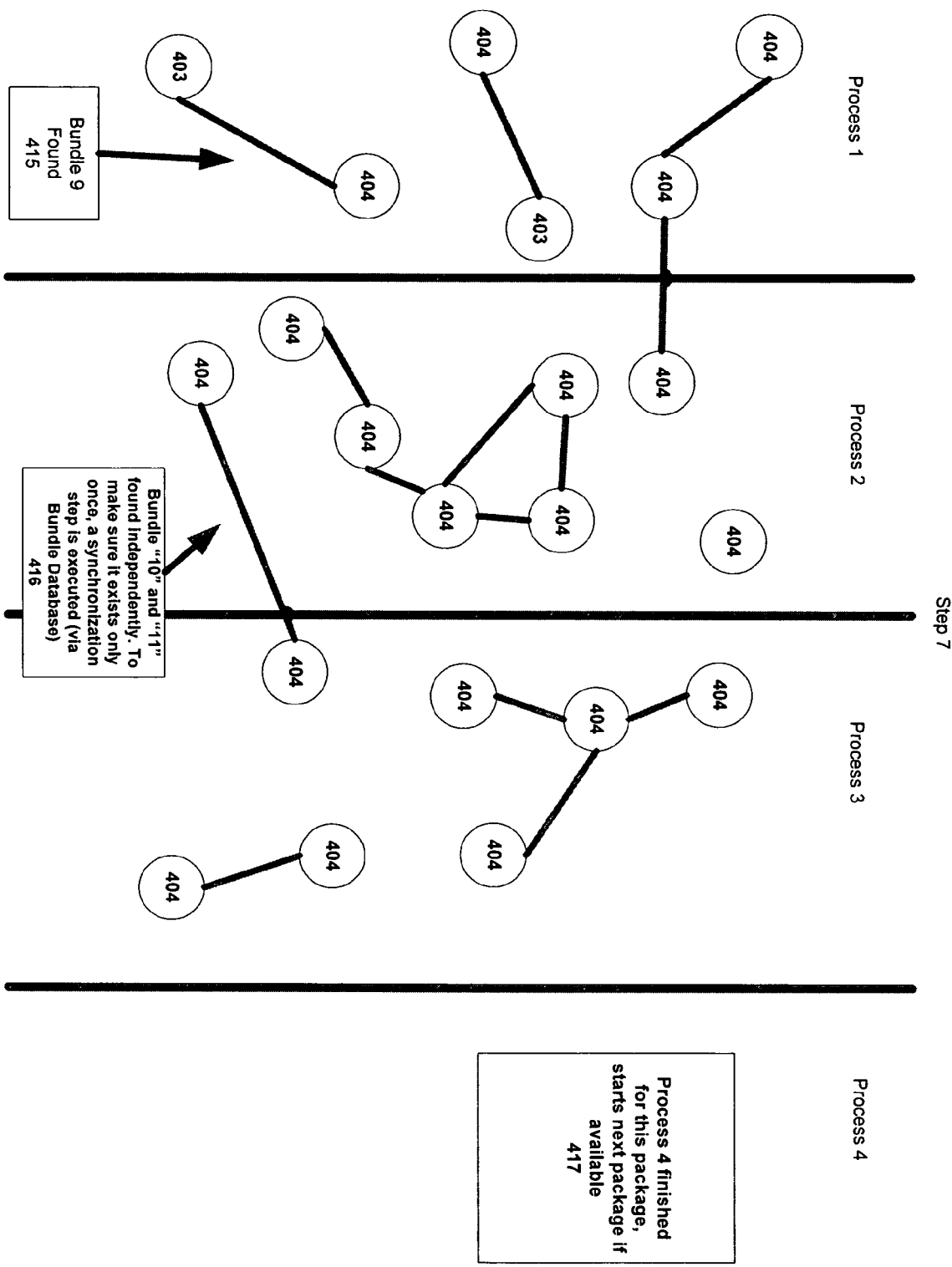

FIG. 4i illustrates an example seventh step of a bundling process. A ninth bundle is found 415 by Process 1, a tenth and eleventh bundle are created at the same time 416. The tenth and eleventh bundle are found independently and simultaneously by Process 2 and 3. In this type of situation, much like the redundant bundle problem of the fourth bundle, the redundant bundle, either the tenth or eleventh, is eliminated in the synchronization step depending on which process finishes its work package first. In addition, the seventh step shows that all nodes in the work package of Process 4 have been analyzed. Process 4 would then commence its synchronization step, checking its bundles against that of the Bundle Data Base. Process 4 would then start the next work package in the queue if there was one available 417.

Figure 4J:
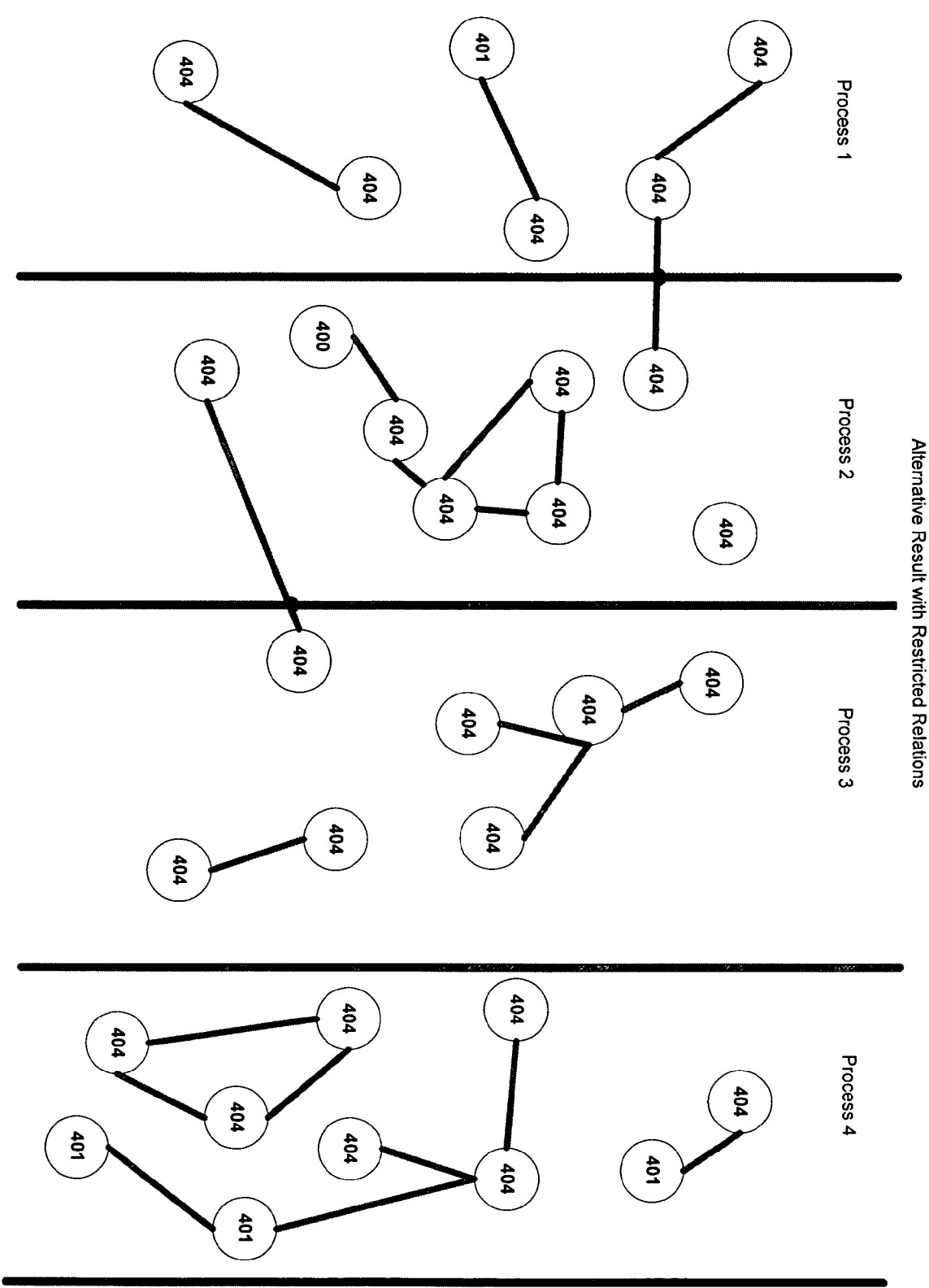
FIG. 4j illustrates an alternative result with restricted relations.

FIG. 4j illustrates an alternative result with restricted relations. For example, looking back at FIG. 4a, rather than finding every relation, as was finally done in FIG. 4i, certain relations are restricted from being linked. Thus, though a relation may exist for the nodes, it is not included in a bundle. FIG. 4j shows all nodes that are finally found, as numbered nodes 404, and those that remain as 401 are nodes that are related but not considered for bundling purposes.

Figure 5:
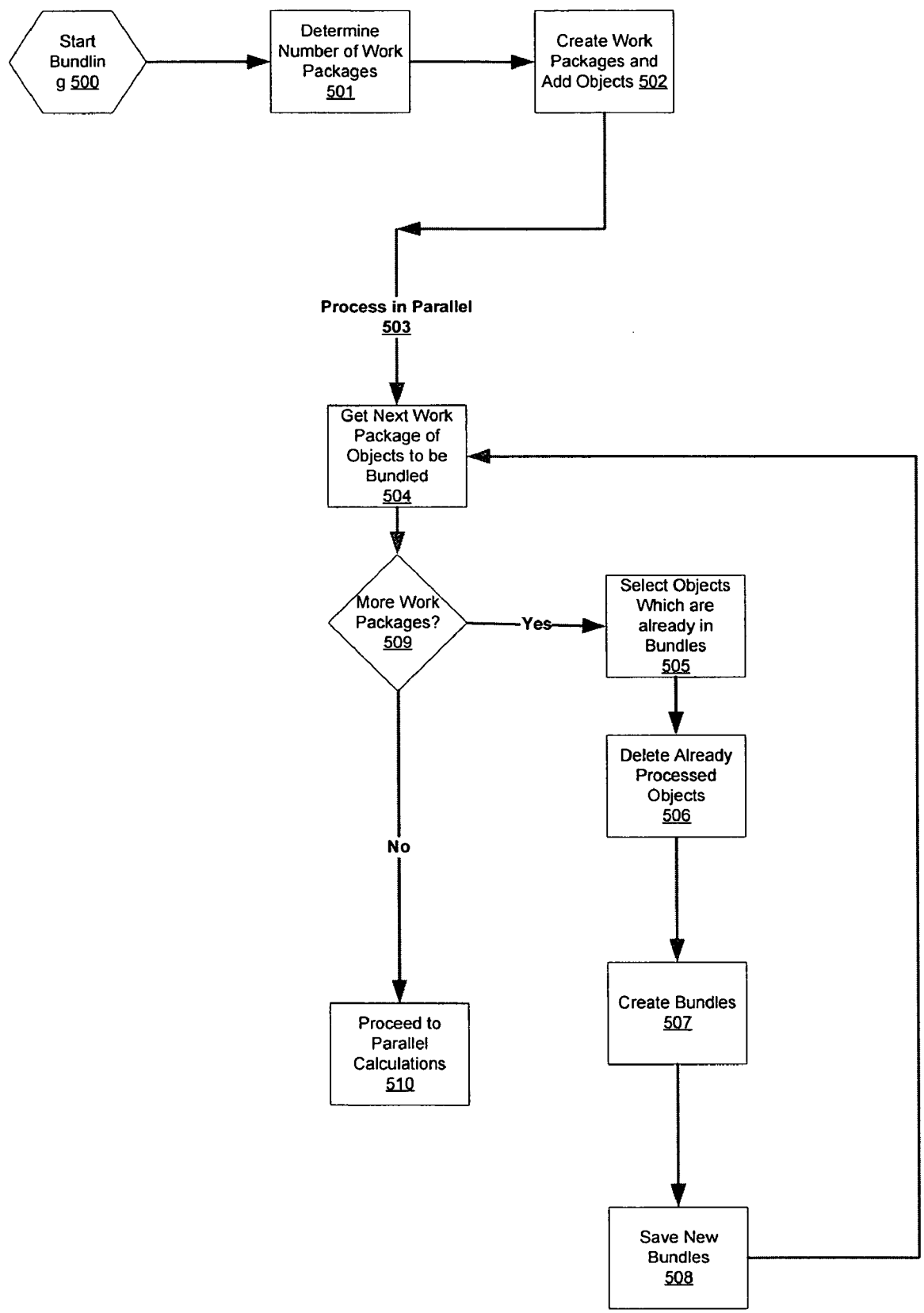
FIG. 5 illustrates the logic and steps an example embodiment may use to perform a bundling process and related calculations.

FIG. 5 illustrates the logic and steps an example embodiment may use to perform a bundling process and related calculations. The user first initiates the process 500. At this point there could be millions of objects. The number of work packages is determined 501 based on any number of factors, such as number of objects or system resources. In the work package distribution process 502, work packages 203 and their corresponding processes are created and objects 202 are distributed 204 to those work packages 203. Once distributed, each work package 203 is processed in parallel 504 in the bundling process 105 wherein bundles are created (with their associated relations and unique ID) and objects 202 are distributed to bundles 205.

In each parallel bundling process, the bundling process gets the first work package of objects to be bundled 504. If there are work packages 509, objects are selected from the packages which are already in bundles 505 and are deleted from the work package 506 so as to reduce processing time in creating bundles that would be discarded later. This deletion is similar to the discarding done in FIG. 4b. Nodes are processed and bundles are created 507 and saved to the Bundle Data Base 508 in the synchronization step after all the objects in the work package have been processed. The process then proceeds to the next work package in the queue. If none exist, the parallel calculation processes is commenced 510 by processing the calculations in the bundles in the Bundle Data Base.

Figure 6:
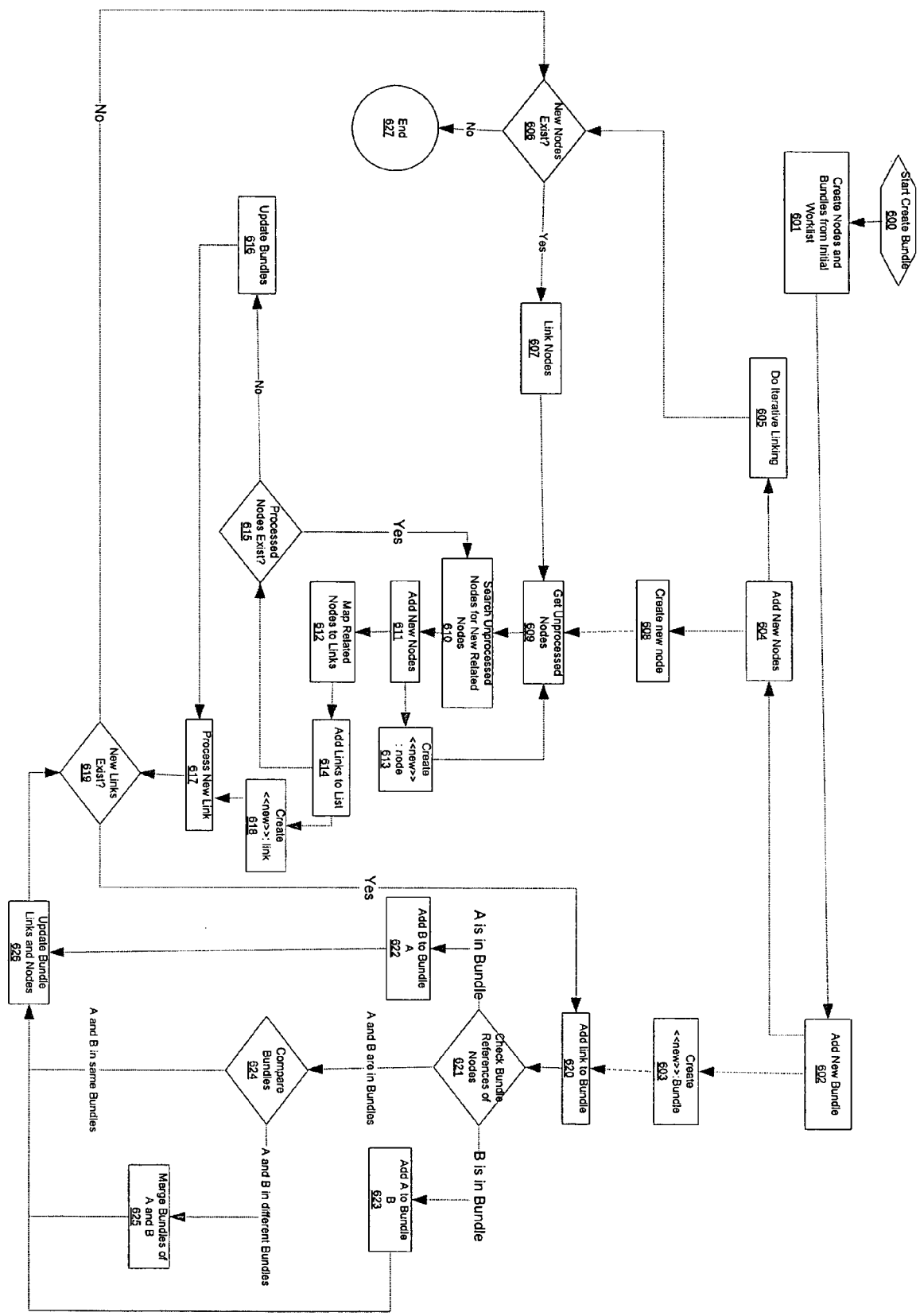
FIG. 6 illustrates a more detailed view of Step 507 of FIG. 5, the creation of bundles.

FIG. 6 illustrates a more detailed view of Step 507 of FIG. 5, the creation of bundles. The Create Bundle step is started 600 by first creating nodes and bundles from an initial worklist 601, thus each node would have a corresponding bundle created for it. When a bundle is ready to be added 602 a new bundle instance is created 603 (the "<<new>>" representing that an instance is created) which waits for all the link data. This comes from the nodes which are added 604. New nodes are created 608 and await linking with all unprocessed nodes. An iterative linking 605 search is done for all other nodes that are related to the new node. If new nodes exist 606 then the nodes are linked 607. All unprocessed nodes are retrieved 609 and of those nodes a search is performed for unprocessed nodes 610. For each of those nodes, a new node instance is created 613 All related nodes and links are mapped 612 and added to a list 614. This processing of new nodes is repeated 615 until no more nodes exist at which time the bundles are updated 616. Each time a link is added to the list 614, a new link instance is created 618 and processed 617 by determining whether the link exists in the bundle 619.

Each new link that was found 619 is added to the bundle 620. The new link composed of nodes A and B must be added to the appropriate bundle depending on the already existing references to bundles. This is done by checking the bundle references of nodes 621. If A is in a bundle, then B is added to the Bundle containing A 622 and the bundle is updated with the link and nodes 626. If B is in a bundle, then A is added to the Bundle containing B 623 and the bundle is updated with the link and nodes 626. If A and B are in bundles then the bundles are compared. If A and B are in different bundles, then the bundles are merged 625 and the bundle is updated with the links and nodes 626. If A and B are in the same bundles then the bundle is simply updated with the links and nodes 626. The bundling process proceeds to either look for new links 619 or new nodes 606. When no new nodes exist, the bundle creation process is complete 627.

The logic performed for data in objects may also be applied similarly to actual tables in a database. For example, one may be motivated to apply the logic in the embodiment to that of a database by extracting out the metadata from objects and creating bundles based on possible relations in the database tables rather than explicit relations between specific objects.

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. A computer-implemented method for performing operations, comprising:
   dividing a list of business objects to be processed into work packages, each business object storing data used in operation of a business task performed by a computer and a link to a related business object;
   processing in parallel the work packages to place business objects into bundles, comprising:
      for each bundle, accessing an initial business object in a work package;
      searching, using a search algorithm, through links stored in the initial business object to identify other business objects affected by manipulation of data stored in the initial business object;
      placing the links and the identified business objects in the bundle;
      discovering the identified business objects by iteratively repeating said accessing, said searching, and said placing for each business object placed in the bundle; and
      generating a unique bundle identifier for the bundle based on the business objects and the links placed within the bundle; and performing in parallel operations using the business objects in the bundles.

2. The method according to claim 1, wherein objects and relations have different representations of data.

3. The method according to claim 1, wherein each object has associated relations to other objects according to given bundling settings.

4. The method according to claim 1, wherein each object has associated relations that are restricted in bundling.

5. The method according to claim 1, wherein completed bundles are placed in a Bundle Data Base.

6. The method according to claim 1, wherein operations make calls to a database.

7. The method according to claim 1, wherein the operations are calculations.

8. The method according to claim 1, wherein the operations are performed as soon as a bundle is complete with all related objects together.

9. The method according to claim 1, wherein the objects are divided into work packages in a randomized order.

10. The method according to claim 1, wherein the objects are divided into work packages with prior optimization.

11. The method according to claim 10, wherein optimization is a heuristic based on past experience.

12. The method according to claim 1, wherein the objects are divided into work packages by ranges.

13. The method according to claim 1, wherein the objects are divided into work packages using a modulus operator.

14. The method according to claim 1, wherein a number of work packages is greater than a number of available parallel processes.

15. The method according to claim 1, wherein processing in parallel the work packages comprise iterating through the objects in a work package, creating bundles, and placing objects in a bundle.

16. The method according to claim 1, wherein processing in parallel the work packages is able to work with different representations of objects and relations in data in the objects.

17. The method according to claim 15, wherein, when creating bundles, relations of an object are determined using a search method.

18. The method according to claim 1, wherein each bundle has an associated unique identifier.

19. The method according to claim 18, wherein the unique identifier is derived from objects in the bundle.

20. The method according to claim 1, wherein redundant bundles are discarded.

21. The method according to claim 5, wherein database accesses and redundant processing are minimized.

22. A system comprising:
a database; and
a computing device, wherein the computing device divides a list of business objects to be processed into work packages, each business object storing data used in operation of a business task performed by a computer and a link to a related business object,
processes in parallel the work packages to place objects into bundles, comprising:
for each bundle, accessing an initial business object in a work package,
searching, using a search algorithm, through links stored in the initial business object to identify other business objects affected by manipulation of data stored in the initial business object,
placing the links and the identified business objects in the bundle,
discovering the identified business objects by iteratively repeating said accessing, said searching, and said placing for each business object placed in the bundle, and
generating a unique bundle identifier for the bundle based on the business objects and the links placed within the bundle, and
performs in parallel operation using the business objects in the bundles.

23. The system according to claim 22, wherein objects and relations have different representations of data.

24. The system according to claim 22, wherein each object has associated relations to other objects according to given bundling settings.

25. The system according to claim 22, wherein each object has associated relations that are restricted in bundling.

26. The system according to claim 22, wherein completed bundles are placed in a Bundle Data Base.

27. The system according to claim 22, wherein operations make calls to a database.

28. The system according to claim 22, wherein the operations are calculations.

29. The system according to claim 22, wherein the operations are performed as soon as a bundle is complete with all related objects together.

30. The system according to claim 22, wherein the objects are divided into work packages in a randomized order.

31. The system according to claim 22, wherein the objects are divided into work packages with prior optimization.

32. The system according to claim 31, wherein optimization is a heuristic based on past experience.

33. The system according to claim 22, wherein the objects are divided into work packages by ranges.

34. The system according to claim 22, wherein the objects are divided into work packages using a modulus operator.

35. The system according to claim 22, wherein a number of work packages is greater than a number of available parallel processes.

36. The system according to claim 22, wherein processing in parallel the work packages comprise iterating through the objects in a work package, creating bundles, and placing objects in a bundle.

37. The system according to claim 22, wherein processing in parallel the work packages is able to work with different representations of objects and relations in data in the objects.

38. The system according to claim 36, wherein, when creating bundles, relations of an object are determined using a search method.

39. The system according to claim 22, wherein each bundle has an associated unique identifier.

40. The system according to claim 39, wherein the unique identifier is derived from objects in the bundle.

41. The system according to claim 22, wherein redundant bundles are discarded.

42. The system according to claim 26, wherein database accesses and redundant processing are minimized.

43. A computer readable storage medium storing a set of instructions that when executed by a processor performs a method comprising:
dividing a list of business objects to be processed into work packages, each business object storing data used in operation of a business task performed by a computer and a link to a related business object;
processing in parallel the work packages to place business objects into bundles, comprising:
for each bundle, accessing an initial business object in a work package;
searching, using a search algorithm, through links stored in the initial business object to identify other business objects affected by manipulation of data stored in the initial business object;
placing the links and the identified business objects in the bundle;
discovering the identified business objects by iteratively repeating said accessing, said searching, and said placing for each business object placed in the bundle; and
generating a unique bundle identifier for the bundle based on the business objects and the links placed within the bundle; and
performing in parallel operations using the business objects in the bundles.

44. A system comprising:
means for dividing a list of business objects to be processed into work packages, each business object storing data used in operation of a business task performed by a computer and a link to a related business object;
means for processing in parallel the work packages to place business objects into bundles, comprising:
for each bundle, means for accessing an initial business object in a work package;
means for searching, using a search algorithm, through links stored in the initial business object to identify business objects affected by manipulation of data stored in the initial business object;
means for placing the links and the identified business objects in the bundle;
means for discovering the identified business objects by iteratively repeating said accessing, said searching, and said placing for each business object placed in the bundle; and
means for generating a unique bundle identifier for the bundle based on the business objects and the links placed within the bundle; and
means for performing in parallel operations using the business objects in the bundles.

* * * * *